United States Patent [19]

Schlegel et al.

[11] Patent Number: 6,112,393

[45] Date of Patent: *Sep. 5, 2000

[54] PROCESS FOR THE ASSEMBLY OF ENGINES

[75] Inventors: Mark Schlegel, Cranberry Township; Jerry P. Rihel, Grove City; Lawrence T. Monocello, Erie; Ronald L. Link, Grove City; John A. Duzyk, Edinburg, all of Pa.

[73] Assignee: General Electric Company, Schenectady, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 09/165,478

[22] Filed: Oct. 2, 1998

[51] Int. Cl.[7] ........................... B23Q 17/00; G01M 19/00
[52] U.S. Cl. ........................... 29/407.01; 29/429; 29/430; 29/705; 29/711; 29/783; 29/791; 29/888.01
[58] Field of Search ................... 29/407.01, 429, 29/430, 705, 711, 783, 791, 888.01

[56] References Cited

U.S. PATENT DOCUMENTS

| | | |
|---|---|---|
| 3,938,377 | 2/1976 | Converse, III et al. ............ 73/117 |
| 4,782,794 | 11/1988 | Hsu et al. . |
| 4,850,102 | 7/1989 | Hironaka et al. ............ 29/787 |
| 5,394,851 | 3/1995 | Cryer et al. . |
| 5,446,389 | 8/1995 | Lenz . |
| 5,544,486 | 8/1996 | Lu . |
| 5,557,834 | 9/1996 | Miyanaka et al. ............ 29/430 |
| 5,771,554 | 6/1999 | Komiya ............ 29/430 |

FOREIGN PATENT DOCUMENTS

| | | | |
|---|---|---|---|
| 0041857 | 2/1990 | Japan | ............ 29/711 |
| 403023924 | 2/1993 | Japan | ............ 29/888.01 |
| 405111833 | 5/1993 | Japan | ............ 29/430 |

*Primary Examiner*—David P. Bryant
*Assistant Examiner*—Jermie E. Cozart
*Attorney, Agent, or Firm*—Welsh & Katz, Ltd; Carl Rowold

[57] ABSTRACT

A process for assembling an engine from an engine frame includes the steps of defining a plurality of work steps necessary to assemble the engine. Each of the work steps has associated therewith a time period for carrying out that work step. A sequence of work steps is established to effect complete assembly of the engine. A plurality of work stations is defined, including a first work station and a last work station, for carrying out the work steps. Each work station includes at least one of the work steps and defines an assembly sequence. Work steps are allocated within the work stations in the assembly sequence to effect an aggregate of the time periods at each station for carrying out the work steps within that work station. The aggregate is about equal to respective aggregates of time periods at each of the other stations for carrying out the work steps within these other work stations. An engine frame is conveyed through the work stations, and the work steps are performed on the engine frame at each of said work stations in the established sequence to complete assembly of the engine. The time period that the engine frame resides at any of the work stations is levelized so that the time period at any one station is substantially equal to the time period that the engine frame resides at any of the other work stations.

22 Claims, 2 Drawing Sheets

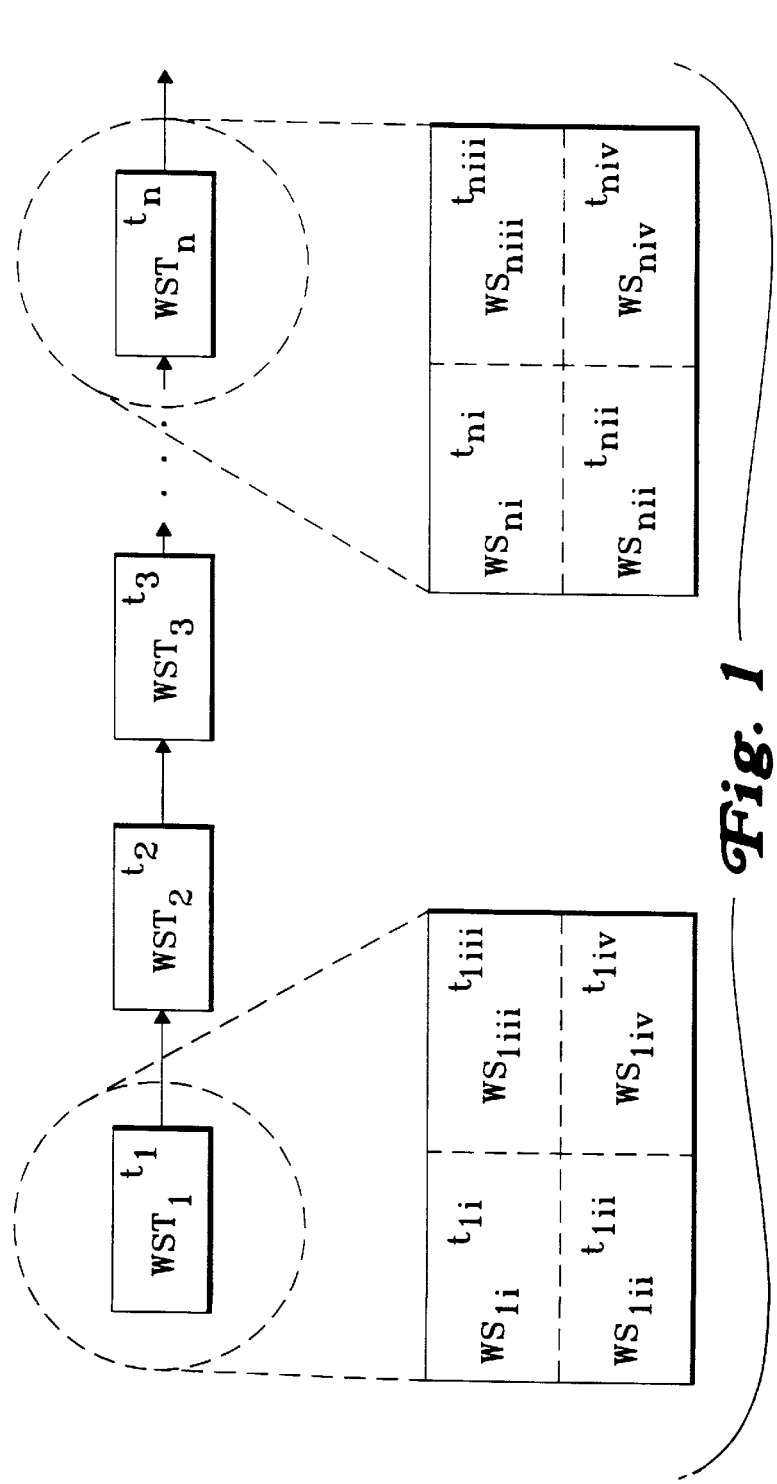
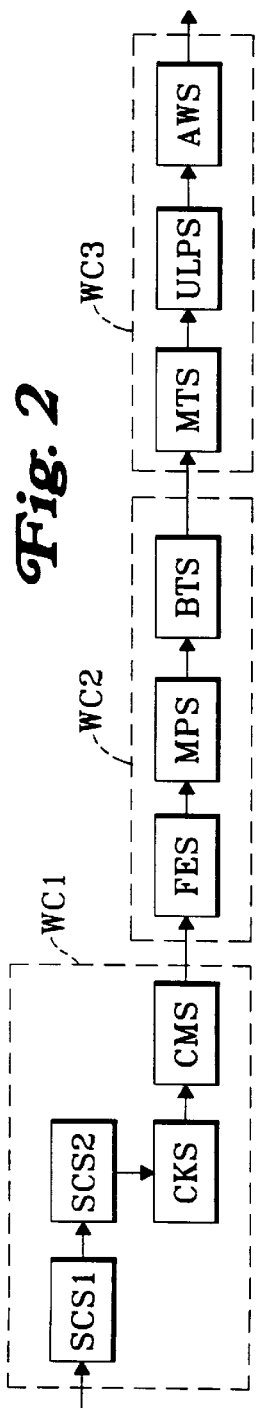
Fig. 1
Fig. 2

PROCESS FOR THE ASSEMBLY OF ENGINES

FIELD OF THE INVENTION

This invention pertains to a work assembly process. More particularly, the invention pertains to a reduced cycle time process for the assembly of diesel engines.

BACKGROUND OF THE INVENTION

Engines, such as diesel engines used to power locomotives, water craft and the like are large complex machines that must be assembled with particular care to all details, major and minor. While this is true for all large diesel engines, it is particularly so for those engines as noted above, that are used to provide powered moving vehicles and craft.

Typically, the assembly of a large engine, such as that in the 2,500 to 4,500 horse-power range, requires between 7 and 12 days to assemble the engine, from the time that the frame or engine block is machined-complete, until the engine is ready for performance or power testing. While various processes and methods for assembling these engines are known, it has not heretofore been known to assemble such engines in less than about 6 to 7 days.

To this end, one area in which productivity can be increased and thus costs reduced is in the assembly of these engines. One known process for assembling engines entails moving the engines in a side-by-side fashion between workstations for the assembly of various parts to the frame. In such a process, the engine is supported by an overhead crane from which is hung by a sling or like overhead supporting device for supporting the engine frame. In such an assembly operation, the semi-completed engine frames are moved among various places on the assembly floor for the attachment or assembly of various parts to the engine frame. In such a process, the parts are moved to the engine frames as necessary and the engine frames are moved around the floor at their various stages of completion.

Although such an assembly process culminates in the assembly of an engine, it is inefficient and results in low productivity for a number of reasons. First, in such an assembly process, typically a large number of engines are being assembled at any given time. Thus, the number of parts in inventory must be maintained at a relatively high level. Such a high level of inventory stores increases the cost for assembling the engines, in that inventoried parts costs must be borne early in the assembly process, if not before assembly begins. In addition, assembling engines in such a fashion requires continuous movement of parts to the engine frame without a predetermined or set location wherein in the plant that parts are to be assembled to the frame. Transporting these parts is both time and labor consuming which results in additional costs for assembling the engines. Furthermore, with such a large number of engines being constructed at any given time, the ability to change or modify the engine design is reduced because of the great extent of work in progress.

Accordingly, there exists a need for a reduced time cycle process for the assembly of diesel engines. Preferably, such a process results in a reduction of required inventory of parts that is needed to be maintained for assembly of the engines. Most preferably, such a process is carried out so that a lesser number of engines are assembled or on the assembly line at any given time, while the cycle time for assembly is efficiently short to culminate in an increased number of engines being completed in a given time period.

SUMMARY OF THE INVENTION

A process for assembling an engine from an engine frame includes defining a plurality of work steps that are necessary to assemble the engine. The work steps each have associated therewith a time period for carrying out that work step. A sequence of work steps is established to effect complete assembly of the engine.

A plurality of work stations is defined, including a first work station and a last work station, for carrying out the work steps. Each work station includes at least one of the work steps. The work stations further define a sequence of assembly.

The works steps are allocated within the work stations, in the sequence established, to effect an aggregate of the time periods at each work station for carrying out the work steps within that work station. The aggregate time at any one work station is equal to respective aggregates of time periods at each other work station for carrying out the work steps within each other work station.

An engine frame is conveyed through the work stations from the first work station to the last work station. The work steps are performed on the engine frame at each of the work stations in the established sequence, and engine assembly is completed, wherein the time period that the engine frame resides at any of the work stations is substantially equal to the time period that the engine frame resides at any of the other work stations.

DESCRIPTION OF THE DRAWINGS

FIG. 1 is a flow diagram of a work flow process in accordance with the principles of the present invention;

FIG. 2 is a flow diagram illustrating an exemplary work flow process for assembling diesel engines, embodying the principles of the present invention;

DETAILED DESCRIPTION OF THE PREFERRED EMBODIMENTS

Figure 4:
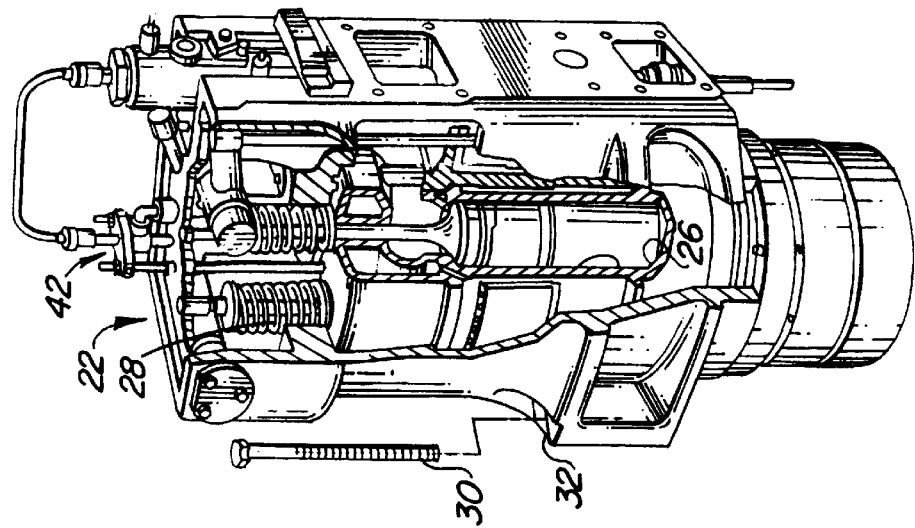
FIG. 4 is a view, partially broken away, of a main power assembly used in assembling the engine of FIG. 3.

While the present invention is susceptible of embodiment in various forms, there is shown in the drawings and will hereinafter be described presently preferred processes with the understanding that the present disclosure is to be considered an exemplification of the invention and is not intended to limit the invention to the specific processes illustrated.

Referring to FIG. 1, the present work process includes defining a plurality of work steps $ws_{1i} \ldots ws_{niv}$ from commencement to completion of assembly of an engine. The work steps $ws_{1i} \ldots ws_{niv}$ are defined to establish a predetermined sequence to effect complete assembly. Each of the work steps $ws_{1i}, ws_{1ii} \ldots ws_{niii}, ws_{niv}$ has associated therewith a time period $t_{1i}, t_{1ii} \ldots t_{niii}, t_{niv}$ necessary to carry out that particular work step. It is to be understood that the present process for assembling an engine is applicable to new engines, as well as rebuilt engines. Such engine rebuilds can be carried out using refurbished or repaired parts, or new parts, or a combination of refurbished/repaired parts and new parts.

A plurality of work stations $wst_1, wst_2 \ldots wst_n$ is defined or established, and the work steps $ws_{1i} \ldots wst_n$ are allocated to the work stations based upon relatedness of the work steps $ws_{1i} \ldots ws_{niv}$, and the time period $t_{1i}, t_{1ii} \ldots t_{niii}, t_{niv}$ necessary to carry out the specific work steps $ws_{1i} \ldots ws_{niv}$. The aggregate time period $t_1, t_2 \ldots t_n$ at each work station is set about equal to the aggregate time period for each other work station, thus effecting a levelized work-time among the stations.

In this manner, the time $t_1, t_2 \ldots t_n$ necessary to complete the work steps at any of the plurality of work stations $wst_1$, $wst_2 \ldots wst_n$ is about equal to the time necessary to complete the work steps at any of the other work stations. In a preferred process, the work steps are sequentially ordered relative to the work stations and process so that any work steps required as a precursor to any other work step are so carried out. In a most preferred work process, the work stations are arranged in work cells so as to efficiently carry out the work at each station relative to each other station.

A work piece, such as an engine frame, is conveyed sequentially through each station $wst_1, wst_2 \ldots wst_n$ so as to perform the work necessary at the various stations. Preferably, the work piece is conveyed through the several stations on a supported conveying apparatus, in which the conveying operation is effected only by an action of an operator. To this end, the work piece can be transported through the several stations so as to "rest" at a station, and "move" among the stations by positive action of an operator engaging an actuator to transport the work piece. In a most preferred process, the work is coordinated so that engine frames are moved from one station to the next station simultaneously with the movement of the other engine frames from their respective current work stations to their respective next stations. It will however be recognized that although such coordinated movement is preferred, it is not necessary to carry out the present process.

Figure 3:
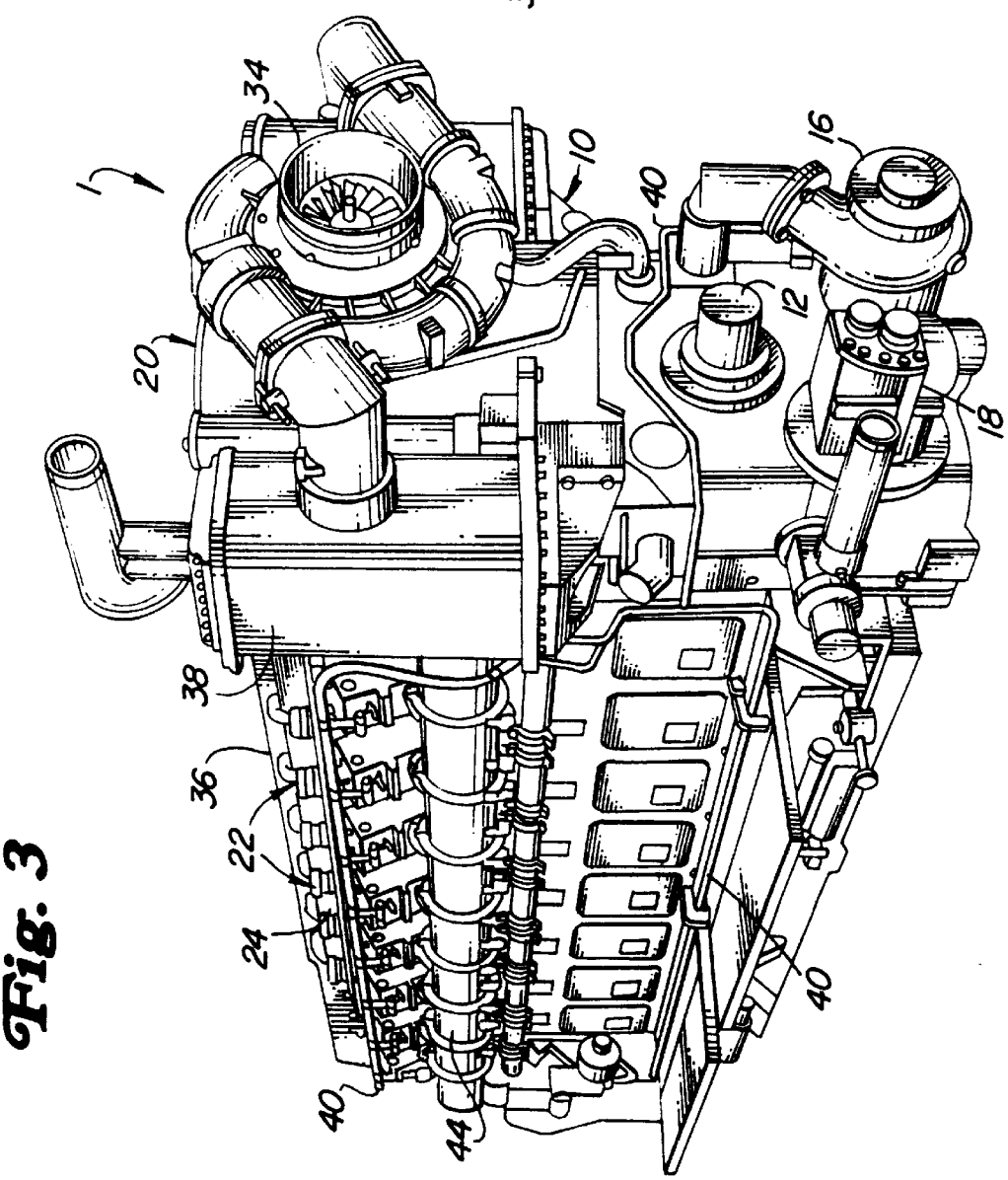
FIG. 3 is an illustration of an exemplary diesel engine assembled in accordance with the principles of the present invention.

FIG. 2 illustrates an exemplary flow process wherein about ten (10) work stations are used for the assembly of diesel engines, such as the engine 1 illustrated in FIG. 3. The flow process includes a plurality of discrete, individualized, workflow units or work steps, each being conducted or performed at a particularized, identified station, SCS1 . . . AWS. Referring now to FIGS. 2–4, in the exemplary process, an engine frame or block 10 that has been fully machined and ready for assembly is positioned ahead of the first station (SCS1). At the first station, referred to as Sonic Cleaning Station 1 (SCS1), the engine frame 10 is immersed into a pool containing water and various chemicals for cleaning the frame 10. Those skilled in the art will recognize the various chemicals that can be used for carrying out the cleaning of the frame 10. In addition to immersing the frame 10 in water and other cleaning chemicals, the frame 10 is exposed to ultrasonic sound waves which, in conjunction with the chemically treated water, facilitates cleaning the engine frame 10. After removal from the pool at Sonic Station 1, the engine frame 10 is immersed in a second pool of cleaning solution for cleaning the frame 10 using a process similar to that used at Sonic Station 1. This is Sonic Station 2 (SCS2).

Subsequent to cleaning, the engine frame 10 is positioned on a supporting carriage for conveying the frame 10 through a plurality of assembly stations, e.g., work stations, (FES . . . AWS) in an indexed manner. The carriage is driven by a conveying apparatus, such as a chain drive, among the several stations. Preferably, the carriage engages the conveying apparatus only upon positive engagement of an actuator, latch or like mechanism mounted on the carriage. Most preferably, the actuator is operably connected to and engages the conveying apparatus only upon positive action of an operator, and returns to a disengaged condition upon release of the actuator by the operator.

The cleaned frame 10 is transported to the next (third) station where the crankshaft 12 is installed into the frame 10; this is the Crankshaft Station (CKS). At the Crankshaft Station (CKS), crankshaft 12 is lowered into the frame 10, properly set in the frame 10 and bolted into position. The frame 10 is then transported to the next (fourth) station, the Cam Station (CMS). At the Cam Station (CMS), one or more cam shafts (not shown) are positioned in the frame 10, properly located relative to the crankshaft 12, and bolted into place within the frame 10. At this time, the engine frame 10, with the crankshaft 12 and cam shafts installed, is forwarded to the next (fifth) station, referred to as the Forward End Station (FES). At the Forward End Station (FES), the pump drivers, such as the water pumps 16 and lube oil pumps 18 are installed onto the front end 20 of the frame 10. Typically, these pumps 16, 18 are directly driven, by a gearset (not shown) or the like, from the crankshaft 12. To this end, the gearing among the pumps 16, 18 and the crankshaft 12 is also installed at the Front End Station (FES).

Following the front end assembly, the partially assembled frame 10 is transported to the next (sixth) station, the Main Power Station (MPS). At the Main Power Station (MPS), the pre-assembled main power assemblies 22 are installed onto the top 24 of the frame 10. The power assemblies 22 house the cylinders 26, the reciprocating pistons (not shown), and the intake and exhaust valve assemblies, illustrated generally at 28, which are located on the top of the power assemblies 22. At the Main Power Station (MPS), the connecting rods (not shown) extending from the pistons are mounted to the crankshaft 12 that was previously installed into the frame 10 at the Crankshaft Station (CKS).

Following the Main Power Station (MPS), the frames 10 are transported to the Torque Station (BTS, the seventh station) where bolts 30 are inserted through flanges 32 on the main power assemblies 22 and into the frame 10 to secure the main power assemblies 22 to the frame 10. Those skilled in the art will recognize the importance of applying the proper torque to the main power assembly bolts 30 to assure the proper operation of the pistons and the engine 1 generally, as well as to assure that a proper seal is established between the main power assemblies 22 and the frame 10. To this end, at the Torque Station (BTS), each of these bolts 30 is tightened onto the main power assembly 22 and engine frame 10 to a predetermined torque to assure a proper seal between the main power assemblies 22 and the frame 10. In a present process, each main power assembly 22 is secured to the frame 10 by four bolts 30, each bolt 30 being positioned through the flange 32, at the four corners thereof.

The frame 10 is next transported to the Manifold/Turbo Station (MTS, the eighth station). At this station, the turbocharger 34 is installed onto the frame 10, above the forward end 20 of the engine 1, at about the main power assemblies 22. The exhaust manifold 36 is installed, connecting the exhaust sides/ports of the main power assemblies 22 to the turbocharger 34 to route the exhaust gases to the turbocharger 34 to provide power thereto. An intercooler 38 may also be installed at this station to cool the intake air as it exits the turbocharger 34.

Following installation of the exhaust manifold 36 and turbocharger 34, the frame 10 is transported to the Upper and Lower Piping Station (ULPS, the ninth station). At this station, the majority of the small bore piping, indicated generally at 40, is installed at both the upper portion of the engine 1, (at about the main power assemblies 22) and the lower portion of the engine 1 (external to the engine frame 10 at about the crankshaft 12 and cam shafts). The small bore piping 40 includes, for example, lube oil piping, cooling water piping, fuel piping and the like. Fuel lines are installed running at about the main power assemblies 22 to provide fuel supply to each of the assemblies 22. At the Upper and Lower Piping Station (ULPS), fuel injectors 42 are installed onto the main power assemblies 22. The fuel injectors 42 can include mechanical injectors, electronic injectors and the like.

The Air and Water Station (AWS) is the last, or tenth station. At the Air and Water Station (AWS), the intake manifold 44 is installed, extending from the turbocharger 34 to the intake sides/ports of the main power assemblies 22. The piping 40 and manifolds 36, 44 are then tested for physical integrity, e.g., hydrodynamic integrity, to assure that any and all seals are maintained around the piping sections and manifolds when the engine 1 and components are subjected to pressure.

Subsequent to the Air and Water Station (AWS), the engine 1 is removed from the conveyor and supporting carriage, and is moved off of the assembly line. The engine 1 is now ready for power testing. Power testing is conducted, in which an alternator is temporarily installed to the rear of the engine. The engine is transported into a test bay and is operated for a predetermined period of time to assure that the engine is working within specification requirements. Following testing, the engine is permitted to cool, fully washed down, masked off and painted after which, the engine is ready for shipment to a purchaser.

Typically, the stations are arranged in a plurality of work cells. For example, Work Cell 1 (WC1), includes four work stations, namely Sonic Stations 1 and 2 (SCS1 and SCS2), the Crankshaft Station (CKS) and the Cam Station (CMS). Work Cell 2 (WC2), includes three work stations, the Front End Station (FES), the Main Power Station (MPS) and the Torque Station (BTS), which are stations 5 through 7. The final work cell, Work Cell 3 (WC3), includes three work stations, the Manifold Station (MTS), the Upper and Lower Piping Station (ULPS) and the Air and Water Station (AWS). Arrangement of the stations and cells permits the establishment of a levelized work flow and work-time within each station and a predetermined, predictable work-time within each cell.

Unlike known processes for the assembly of diesel engines, in the present process, the work within each work station is allocated to each station so as to constitute a specific period, preferably about 4 hours, in which the work can be performed. That is, the work at stations 1 through 10 requires that the frame be at "rest" for assembly at each of the stations for a period of about 4 hours. As such, the assemblers at each station or within each cell can be highly trained for the specified tasks required within that particular station or cell. The result of such a process is increased efficiency and productivity in the assembly of these large diesel engines.

The present work assembly process is used for the assembly of diesel engines generally having 8, 12 or 16 cylinders in a V configuration. These engines generate about 2500 to about 4500 horse power and are used for transportation service, such as locomotives and marine service, as well as stationary power applications.

Using the present work process, it has been observed that the total time necessary to assemble and "pressure" test an engine, subsequent to fabrication of the engine frame, can be reduced to about 40 to 48 hours, with less actual person-hours required for assembly. Including cleaning and painting, using the present process, an engine can be ready for delivery in about 3 days. This is a totally unexpected result, and reduces by about one-half the previously known "best" time for assembly of such engines.

Advantageously, the present assembly process has also been observed to effect an increase in productivity of about 7 percent. That is, it has been observed the number of person-hours required to assemble an engine from the time it is machined-complete, until the time it is ready for performance or alternator testing, has been reduced by about 7 percent. In addition, the efficiency of the process has also been observed to have an increased by about 10 percent. That is, over and above the 7 percent productivity increase (e.g., reduction in time to assemble), approximately 10 percent more work can be performed in a given time period. Nevertheless, the increase in efficiency has been used to permit the assemblers to meet on a regular, generally per shift basis, to discuss matters or issues at hand in the assembly process, such as productivity issues, quality issues, as well as material management and inventory issues.

Furthermore, the present assembly process provides an additional, quite notable advantage, over known assembly processes. That is, it has been observed that an equal number, or greater number of engines can be assembled in a given time period, with a lesser number of engines on the line and being assembled at any given time. To this end, whereas it has been known in the past to have for example, as many as 40 engines being constructed or assembled at any given time, utilizing the present process, about half that number or about 20 engines are assembled at any given time to effect the same or a greater number of engines ready for shipment on a daily, weekly, monthly or annual basis. This reduced number of "work-in-process" engines, permits modifications or changes to be made to the engines on a more expeditious basis.

The present process also permits the reduction of parts and inventory or stores necessary for assembling the engines. Those skill in the art will recognize that reducing the inventory or stores of parts reduces the overall costs for assembling these engines. It has also been observed that using the present process, parts inventory and stores are more readily controlled and managed. That is, parts are transferred to the location of assembly to the engine, e.g., the work station, which is a predetermined physical location in the plant. Advantageously, managing this manner of transporting parts to the work station requires less impromptu planning and a more predictable work flow.

As discussed above, the present process is equally applicable for rebuilding engines as well as new engine production. In the "rebuild" process, those engine components or parts that are refurbished or reused (rather than replaced) are tracked along with the new components or parts, and are assembled to the engine frame from which they were removed (and refurbished or repaired) at the appropriate work station.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A process for assembling engines from a series of engine frames flowing through the assembly process comprising the steps of:

defining a plurality of work steps necessary to assemble an engine from an engine frame, each of said work steps having associated therewith a time period for carrying out said work step;

establishing a sequence of said work steps to effect complete assembly of an engine;

defining a plurality of work stations for carrying out said work steps including a first work station and a last work station in serial arrangement for the flow of engine frames through the assembly process from one work station to the next, each said work station including at least one of said work steps and having an engine frame positioned at such work station;

allocating said works steps within said work stations in said sequence to effect an aggregate of time periods at each said station for carrying out the work steps within each said work station so that the aggregate time period for each work station is generally equal to the respective aggregate time period at each other said station for carrying out the work steps within each work station;

conveying engine frames through said work stations from said first work station to said last work station;

performing said work steps on a respective engine frame at each of said work stations in said sequence;

simultaneously advancing the engine frame at each work station to the next work station at time intervals corresponding to said aggregate time period, with each station thus having an engine frame that has been advanced from the previous work station; and completing assembly of an engine wherein the time period that the corresponding engine frame resides at any of said work stations is substantially equal to the time period that said engine frame resides at any of the other work stations.

2. The process for assembling an engine in accordance with claim 1 including the step of cleaning said engine frame a the first work station.

3. The process for assembling an engine in accordance with claim 1 including the step of testing said assembled engine at the last work station.

4. The process for assembling an engine in accordance with claim 1 including the step of conveying a plurality of engine frames through said work stations, wherein only one engine frame resides at any work station at a time.

5. The process for assembling an engine in accordance with claim 1 including about ten work stations.

6. The process for assembling an engine in accordance with claim 1 including ten work stations and further defining three work cells, wherein two of said work cells include three work stations and wherein one of said work cells include four work stations.

7. The process for assembling an engine in accordance with claim 1 wherein the time period that the engine frame resides at any of the work station is about 4 hours.

8. A process for assembling engines from a series of engine frames flowing through the assembly process comprising the steps of:

defining a plurality of work steps necessary to assemble an engine from an engine frame, each of said work steps having associated therewith a time period for carrying out said work step;

establishing a sequence of said work steps to effect complete assembly of an engine;

defining a plurality of work stations for carrying out said work steps including a first work station wherein the engine frame is cleaned and a last work station wherein the assembled engine is tested, said work stations being in serial arrangement for the flow of engine frames through the assembly process from one work station to the next work station each said work station including at least one of said work steps and having an engine frame positioned at such work station;

defining a plurality of work cells and allocating at least two work stations to each of said plurality of work cells in a predetermined sequence;

allocating said works steps within said work stations in said sequence to effect an aggregate of the time periods at each said station for carrying out the work steps within each said work station so that the aggregate time period for each work station is generally equal to the respective aggregate time period at each other said station for carrying out the work steps within each other work station;

conveying engine frames through said work stations from said first work station to said last work station;

performing said work steps on a respective engine frame at each of said work stations in said predetermined sequence;

advancing the engine frame at each work station to the next work station at time intervals corresponding to said aggregate time period, with each work station thus having an engine frame that has been advanced from the previous work station; and completing assembly of an engine wherein the time period that the corresponding engine frame resides at any of said work stations is substantially equal to the time period that said engine frame resides at any of the other work stations.

9. The process for assembling an engine in accordance with claim 8 including the step of conveying a plurality of engine frames through said work stations, wherein only one engine frame resides at any work station at a time.

10. The process for assembling an engine in accordance with claim 8 including about ten work stations.

11. The process for assembling an engine in accordance with claim 8 including ten work stations and three work cells, wherein two of said work cells include three work stations and wherein one of said work cells include four work stations.

12. The process for assembling an engine in accordance with claim 8 including the steps of positioning a crankshaft in the frame and securing the crankshaft therein.

13. The process for assembling an engine in accordance with claim 12 including the step of subsequently positioning at least one cam shaft in the frame and securing the at least one cam shaft therein.

14. The process for assembling an engine in accordance with claim 13 including the step of subsequently assembling to the frame at least one of a lube oil pump and a water pump.

15. The process for assembling an engine in accordance with claim 14 including the step of subsequently assembling to the frame a plurality of main power assemblies, each said assembly including a piston, an intake valve subassembly and exhaust valve subassembly, and mounting a connecting rod from each said piston to said crankshaft.

16. The process for assembling an engine in accordance with claim 15 including the step of subsequently assembling to the frame an exhaust manifold and a turbocharger.

17. The process for assembling an engine in accordance with claim 16 including the step of subsequently assembling to the frame lube oil piping, cooling water piping and fuel supply piping.

18. The process for assembling an engine in accordance with claim 8 wherein the time period that the engine frame resides at any of the work stations is about 4 hours.

19. A process for assembling an engines from a series of engine frames flowing through the assembly process comprising the steps of:

defining a plurality of work steps for assembling a plurality of components parts to an engine frame in a predetermined sequence, each of said work steps having associated therewith a time period for carrying out said work step;

establishing a sequence of said work steps to effect complete assembly of the engine;

defining a plurality of work stations for carrying out said work steps, said work stations including a crankshaft station, a cam station, a front end station, a main power station, a torque station, a manifold station, an upper and lower piping station, and an air and water station, each said work station including assembling at least some of the plurality of components to the engine frame, the work stations being in serial arrangement for the flow of engine frames through the assembly process from one work station to the next work station;

allocating said works steps within each said work station in said predetermined sequence wherein an aggregate time period for each said work station for carrying out the assembly within such work station is generally equal to the respective aggregate time period at each other said station for carrying out the work steps within each other work station;

conveying engine frames through said work stations from said crank shaft station to said air and water station;

assembling at least some of the plurality of components onto the engine frame at said work stations in said predetermined sequence;

advancing the engine frame at each work station to the next work station at time intervals corresponding to said aggregate time period, with each station thus having an engine frame that has been advanced from the previous work station; and completing assembly of an engine wherein the time period that the corresponding engine frame resides at any of said work stations is substantially equal to the time period that said engine frame resides at any of the other work stations.

20. The process for assembling engines in accordance with claim 19 including the step of allocating each of said work stations to a work cell.

21. The process for assembling engines in accordance with claim 20 including the step of defining at least one sonic station.

22. The process for assembling engines in accordance with claim 21 including the step of allocating the at least one sonic station, the crankshaft station and the cam station to a first work cell, allocating the front end station, the main power station and the torque station to a second work cell and allocating the manifold station, the upper and lower piping station and the air and water station to a third work cell.

* * * * *